US012615483B2

(12) United States Patent
Song

(10) Patent No.: US 12,615,483 B2
(45) Date of Patent: Apr. 28, 2026

(54) METHOD FOR PROVIDING MODE OF HEARING AID EARPHONE PROVIDING HEARING MODE AND MUSIC MODE, AND SYSTEM THEREFOR

(71) Applicant: OLIVE UNION, INC., Seoul (KR)

(72) Inventor: Myung Geun Song, Seoul (KR)

(73) Assignee: OLIVE UNION, INC., Seoul (KR)

( * ) Notice: Subject to any disclaimer, the term of this patent is extended or adjusted under 35 U.S.C. 154(b) by 180 days.

(21) Appl. No.: 18/708,711

(22) PCT Filed: Nov. 11, 2022

(86) PCT No.: PCT/KR2022/017779

§ 371 (c)(1),
(2) Date: May 9, 2024

(87) PCT Pub. No.: WO2023/085858

PCT Pub. Date: May 19, 2023

(65) Prior Publication Data

US 2024/0414488 A1 Dec. 12, 2024

(30) Foreign Application Priority Data

Nov. 11, 2021 (KR) ........................ 10-2021-0154570

(51) Int. Cl.
*H04R 25/00* (2006.01)

(52) U.S. Cl.
CPC ............. *H04R 25/70* (2013.01); *H04R 25/48* (2013.01); *H04R 25/554* (2013.01); *H04R 2225/49* (2013.01); *H04R 2460/01* (2013.01)

(58) Field of Classification Search
CPC ...... H04R 25/70; H04R 25/48; H04R 25/554; H04R 2225/49; H04R 2460/01; H04R 2430/01; H04R 1/1041; H04R 25/407; H04R 3/005; H04R 25/45
See application file for complete search history.

(56) References Cited

U.S. PATENT DOCUMENTS

2011/0243339 A1 10/2011 Ang et al.

FOREIGN PATENT DOCUMENTS

| | | | |
|---|---|---|---|
| KR | 10-1122767 | B1 | 3/2012 |
| KR | 10-2013-0029562 | A | 3/2013 |
| KR | 10-1398466 | B1 | 5/2014 |
| KR | 10-1450014 | B1 | 10/2014 |
| KR | 10-2017-0133997 | A | 12/2017 |
| KR | 10-2018-0095343 | A | 8/2018 |
| KR | 10-1903374 | B1 | 11/2018 |
| KR | 10-2019-0104820 | A | 9/2019 |

*Primary Examiner* — Tuan D Nguyen

(74) *Attorney, Agent, or Firm* — ArentFox Schiff LLP; Joseph M. Maraia

(57) ABSTRACT

The present invention relates to a method for providing a mode of a hearing aid earphone that provides external sound and music sound set at customized decibels suitable for a user's hearing condition in a hearing mode of a hearing aid function and a music mode of an earphone function, and to a system therefor.

17 Claims, 6 Drawing Sheets

METHOD FOR PROVIDING MODE OF HEARING AID EARPHONE PROVIDING HEARING MODE AND MUSIC MODE, AND SYSTEM THEREFOR

CROSS-REFERENCE TO RELATED APPLICATIONS

This is a National Stage Application, filed under 35 U.S.C. 371, of International Patent Application No. PCT/KR2022/017779, filed on Nov. 11, 2022, which claims priority to Korean Patent Application No. 10-2021-0154570 filed with the Korean Intellectual Property Office on Nov. 11, 2021, the disclosures of which are incorporated herein by reference in their entireties.

TECHNICAL FIELD

The present invention relates to a method and system for providing a mode of a hearing aid earphone, and more particularly, to technology for providing external sound and music sound set at a customized decibel suitable for a hearing status of a user in a hearing mode of a hearing aid function and a music mode of an earphone function.

RELATED ART

Recently, with the rapid development of biomedical technology, patients who previously did not receive much help from wearing hearing aids have been able to improve their hearing by selecting and wearing appropriate hearing aids.

Among medical devices, the hearing aid is a cutting-edge medical device that is always attached to the body for use. The hearing aid needs to be steadily managed according to a change in hearing and to receive after-sales service (A/S) for damage caused by moisture and foreign substances in the ear. Therefore, the hearing aid is considered one of the most important biomedical technologies.

The existing hearing aid is in the form of a trumpet-shaped sound collector, but the form of an electric hearing aid that helps amplification of sound is currently used. Also, for the hearing aid, there is a bone conductive type that is mounted on the mastoid part, but an airway type structure is generally used. Such hearing aid receives sound wave through a microphone, converts the same to electric vibration, magnifies the same, and converts the sound wave back to an earphone to be heard by ear.

Recently, research is being conducted on a more powerful exclusive hearing aid processor. The exclusive hearing aid processor has a processing rate and a memory that are more than twice as fast as the existing processor and includes small chips and parts with advanced nano technology.

However, since the existing technology for hearing aids was set based on hearing data of persons with difficulty of hearing (hereinafter, "user"), there was a limitation in that data on the user's real-time surrounding noise is not applied. Also, the existing technology for hearing aid has a limitation of providing only limited functions to hearing aids.

DETAILED DESCRIPTION

Technical Subject

An objective of the present invention is to provide a hearing mode of a hearing aid function and a music mode of an earphone function.

An objective of the present invention is to amplify or reduce external sound and music sound at a customized decibel according to a hearing status based on a hearing test of each of a user's left ear and right ear and to output the same to a hearing aid earphone.

Solution

A mode providing system of a hearing aid earphone that provides a hearing mode and a music mode according to an example embodiment of the present invention includes a sound input unit configured to input external sound in the hearing aid earphone; a mode selection unit configured to select at least one mode from among a hearing mode of a hearing aid function and a music mode of an earphone function; a mode processing unit configured to amplify or reduce the external sound according to a customized decibel that complements hearing of each of a user's right ear and left ear in the hearing mode and to amplify or reduce music sound according to the customized decibel in the music mode; and a sound output unit configured to output the amplified or reduced external sound and music sound to the hearing aid earphone.

A mode providing system of a hearing aid earphone that provides a hearing mode and a music mode according to another example embodiment of the present invention includes a hearing test unit configured to test hearing of each of a user's right ear and left ear; a setting unit configured to set a customized decibel that complements the hearing of each of the user's right ear and left ear according to a hearing status of the user based on test results; a sound input unit configured to input external sound; a mode selection unit configured to select at least one mode from among a hearing mode of a hearing aid function and a music mode of an earphone function; a mode processing unit configured to amplify or reduce the external sound according to the customized decibel in the hearing mode and to amplify or reduce music sound according to the customized decibel in the music mode; and a sound output unit configured to output the amplified or reduced external sound and music sound to the hearing aid earphone.

A mode providing method of a hearing aid earphone that provides a hearing mode and a music mode according to an example embodiment of the present invention includes selecting at least one mode from among a hearing mode of a hearing aid function and a music mode of an earphone function; controlling external sound to be amplified or reduced according to a customized decibel that complements hearing of each of a user's right ear and left ear in the hearing mode and music sound to be amplified or reduced according to the customized decibel in the music mode; and outputting the amplified or reduced external sound and music sound to the hearing aid earphone.

A mode providing method of a hearing aid earphone that provides a hearing mode and a music mode according to another example embodiment of the present invention includes testing hearing of each of a user's right ear and left ear; setting a customized decibel that complements the hearing of each of the user's right ear and left ear according to a hearing status of the user based on test results; selecting at least one mode from among a hearing mode of a hearing aid function and a music mode of an earphone function; inputting external sound; controlling the external sound to be amplified or reduced according to the customized decibel in the hearing mode and music sound to be amplified or reduced according to the customized decibel in the music mode; and outputting the amplified or reduced external sound and music sound to the hearing aid earphone.

Effect

According to example embodiments of the present invention, by amplifying or reducing external sound and music sound in a hearing mode of a hearing aid function and a music mode of an earphone function at a customized decibel according to a hearing status based on a hearing test of each of a user's left ear and right ear and by outputting the same to a hearing aid earphone, it is possible to provide clear speech in which undesired noise is removed and to play high quality music.

According to example embodiments of the present invention, by analyzing different audible frequency for each person and by processing external sound and music sound according to a customized decibel, it is possible to improve a hearing function of a user.

BEST MODE

Figure 1:
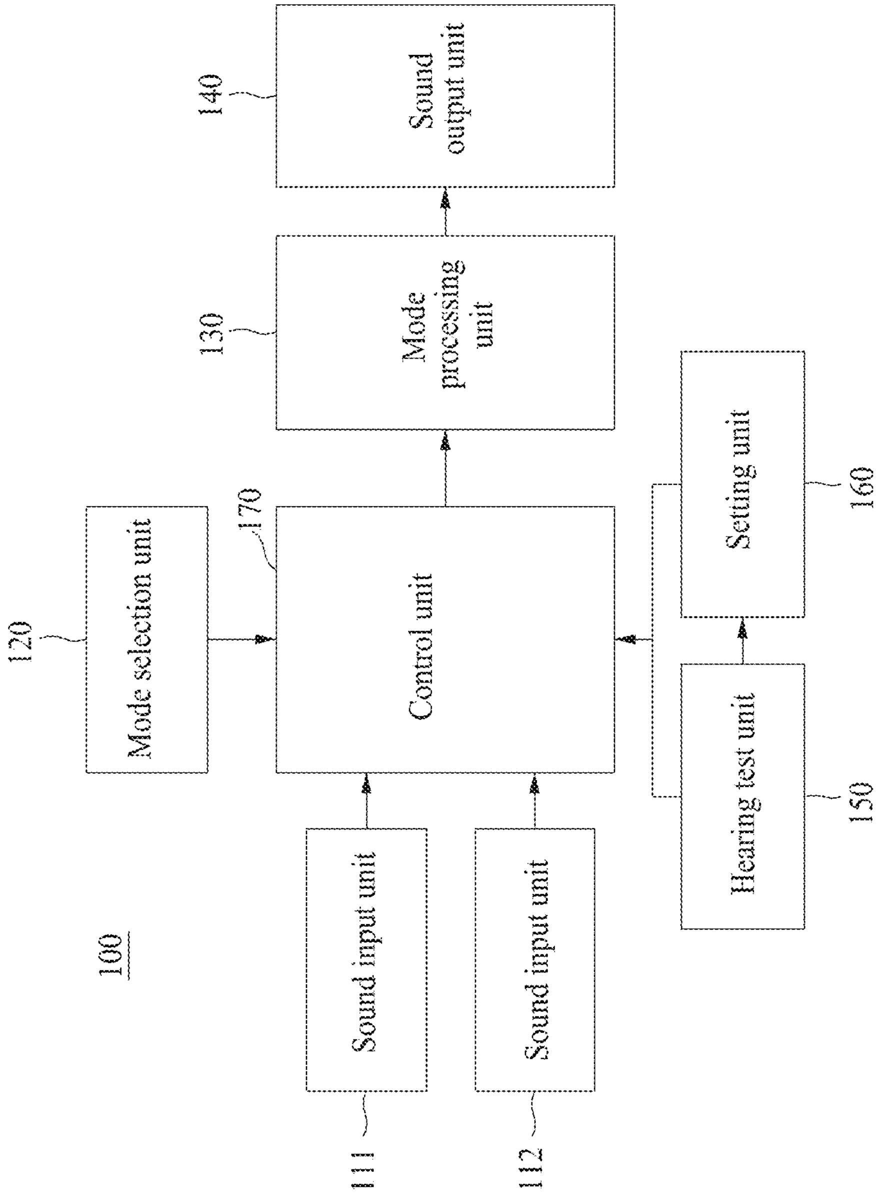
FIG. 1 is a block diagram illustrating a detailed configuration of a mode providing system of a hearing aid earphone according to an example embodiment of the present invention.

Advantages and features of the present invention and methods to achieve the same will become clear with reference to example embodiments described in detail along with the accompanying drawings. However, the present invention is not limited to example embodiments disclosed blow and may be implemented in various forms. Here, the example embodiments are provided to make the disclosure of the present invention complete and to fully inform one of ordinary skill in the art to which the present invention pertains of the scope of the present invention and the present invention is defined by the scope of the claims.

The terms used herein are to explain the example embodiments and not to be limiting of the present invention. Herein, the singular forms "a," "an," and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Unless otherwise defined herein, all terms used herein (including technical or scientific terms) have the same meanings as those generally understood by one of ordinary skill in the art. Also, terms defined in dictionaries generally used should be construed to have meanings matching contextual meanings in the related art and are not to be construed as an ideal or excessively formal meaning unless otherwise defined herein.

Hereinafter, example embodiments of the present invention will be described in detail with reference to the accompanying drawings. Like reference numerals refer to like components and a repeated description related thereto will be omitted.

The present invention relates to technology for a method and system for providing a mode of a hearing aid earphone that provides a hearing mode and a music mode and aims to amplify or reduce external sound and music sound in a hearing mode of a hearing aid function and a music mode of an earphone function at a customized decibel according to a hearing status based on a hearing test of each of a user's left ear and right ear and to output the same to the hearing aid earphone.

Here, the hearing aid earphone according to an example embodiment of the present invention may be a Bluetooth earphone worn on each of the user's left ear and right ear, or may be a different type of earphone or headphone. However, any type of earphone linkable to an application in the user's terminal may be employed.

The terminal (or electronic device) may be at least one of the user's smartphone, desktop personal computer (PC), mobile phone, personal digital assistant (PDA), laptop computer, and tablet PC, and may monitor a hearing status of the user from the hearing aid earphone through an application linked to the hearing aid earphone. Here, the present invention may receive information according to the user's selection input through an application in a portable terminal held by the user and the terminal may include a screen-type display capable of performing a predetermined function set operation through a screen that includes a touch-sensing area and may be a device that includes at least one physical button or virtual button. Therefore, types and forms of the terminal are not limited thereto.

Hereinafter, the present invention is described with reference to FIGS. 1 to 6.

Figure 2:
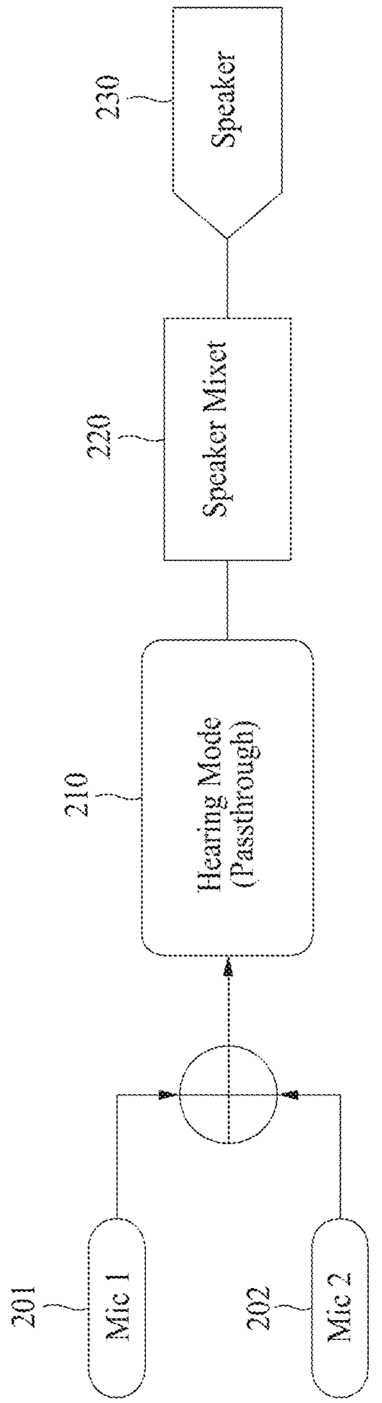
FIG. 2 illustrates a configuration diagram of a hearing mode according to an example embodiment of the present invention.
Figure 3:
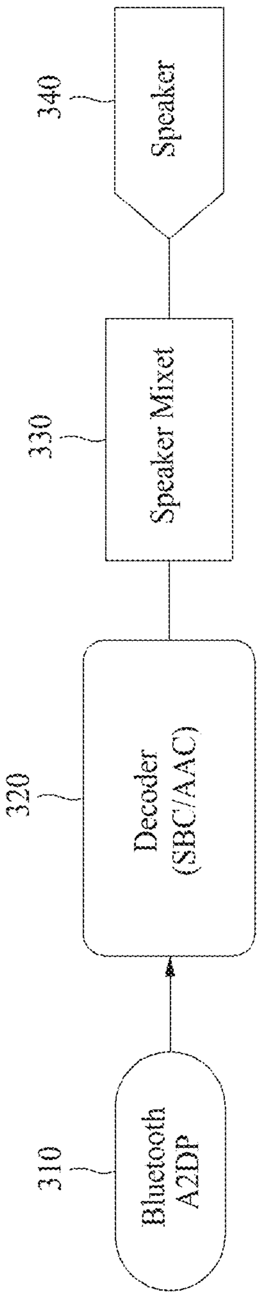
FIG. 3 illustrates a configuration diagram of a music mode according to an example embodiment of the present invention.
Figure 4:
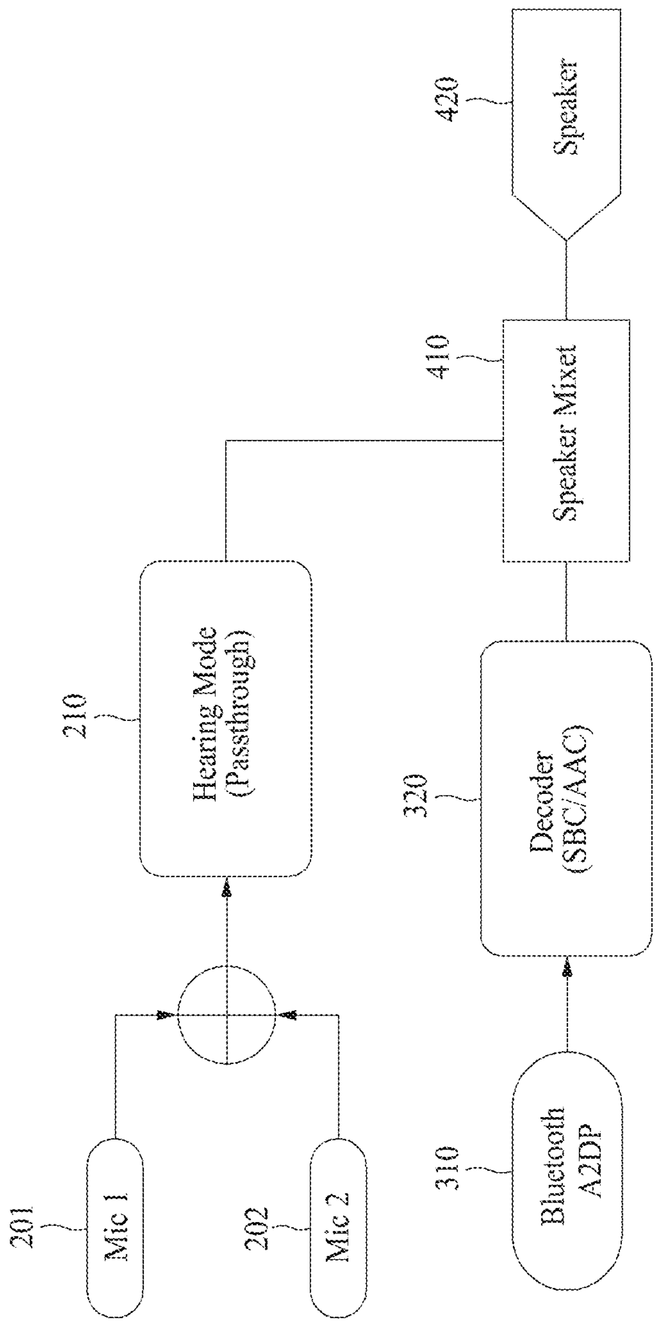
FIG. 4 illustrates a configuration diagram of a combination mode in which a hearing mode and a music mode are combined according to an example embodiment of the present invention.

FIG. 1 is a block diagram illustrating a detailed configuration of a mode providing system of a hearing aid earphone according to an example embodiment of the present invention. Also, FIG. 2 illustrates a configuration diagram of a hearing mode according to an example embodiment of the present invention, FIG. 3 illustrates a configuration diagram of a music mode according to an example embodiment of the present invention, and FIG. 4 illustrates a configuration diagram of a combination mode in which a hearing mode and a music mode are combined according to an example embodiment of the present invention.

Referring to FIG. 1, the mode providing system of the hearing aid earphone according to an example embodiment of the present invention provides external sound and music sound set at a user's customized decibel in a hearing mode of a hearing aid function and a music mode of an earphone function.

To this end, a mode providing system 100 of a hearing aid earphone according to an example embodiment of the present invention includes a sound input unit 111, 112, a mode selection unit 120, a mode processing unit 130, a sound output unit 140, a hearing test unit 150, a setting unit 160, and a control unit 170.

The sound input unit 111, 112 inputs external sound.

The hearing aid earphone is worn on each of the user's left ear and right ear and may include the left sound input unit 111 configured to input left external sound that is input through a left hearing aid earphone worn on the user's left ear and the right sound input unit 112 configured to input right external sound that is input through a right hearing aid earphone worn on the user's right ear. Therefore, the external sound that includes the left external sound and the right external sound is input through the left sound input unit 111 and the right sound input unit 112.

The mode selection unit 120 selects at least one mode from among a hearing mode of a hearing aid function and a music mode of an earphone function. Here, the hearing mode represents the hearing aid function and is a mode selected when having a conversation with another person. The music mode represents the earphone function and is a mode selected when listening to a song and may be a state in which a microphone (Mic) of the hearing aid earphone is locked. The mode selection unit 120 may select the hearing mode, the music mode, or a combination mode in which both are combined depending on the user's selection input, and may select one of the hearing mode, the music mode, and the combination mode depending on a time zone, whether surrounding voice is detected, or whether music is played.

The mode processing unit 130 amplifies or reduces the external sound according to a customized decibel that complements hearing of each of the user's right ear and left ear in the hearing mode and amplifies or reduces the music sound according to the customized decibel in the music mode. The external sound and the music sound amplified or reduced by the mode processing unit 130 are output to the hearing aid earphone through the sound output unit 140.

The mode providing system 100 of the hearing aid earphone according to an example embodiment of the present invention may perform a process of testing the user's hearing and setting the customized decibel before operating the mode processing unit 130.

For example, the hearing test unit 150 may test hearing of each of the user's right ear and left ear. Based on interaction between the left hearing aid earphone and the right hearing aid earphone worn on the user's left ear and right ear, respectively, and an application installed on the user's terminal, the hearing test unit 150 may test the hearing of each of the user's both ears.

Then, the setting unit 160 may determine a hearing status of the user based on test results and may set the customized decibel that complements the hearing of each of the user's right ear and left ear according to the hearing status. For example, even a person with difficulty of hearing may have a different hearing status for each of the left ear and the right ear. Therefore, through the hearing test unit 150, the present invention may determine a hearing status of each of left and right ears suitable for the user, may correct a frequency suitable for each of the left ear and the right ear with an equalizer (EQ), and may set the customized decibel in the music sound and the external sound.

As described above, the mode processing unit 130 may amplify or reduce sound according to the customized decibel that complements the hearing of each of the user's right ear and left ear based on the hearing mode or the music mode, and the combination mode in which the hearing mode and the music mode are combined.

Hereinafter, an algorithm performed in the hearing mode, the music mode, or the combination mode is described in detail with reference to FIGS. 2 to 4.

Describing the hearing mode with reference to FIG. 2, similar to a general hearing aid, external sound input through a left hearing aid earphone 201 and a right hearing aid earphone 202 is amplified or reduced at a customized decibel to suit a hearing status of a user in a speaker mixer 220 through a hearing mode 210, and the amplified and reduced external sound is output through a speaker 230 of the hearing aid earphone. Here, the mode processing unit 130 may adjust an EQ (equalizer) to the customized decibel suitable for the user to minimize noise from an external environment and to amplify voice and may provide clearer voice accordingly.

Describing the music mode with reference to FIG. 3, the music mode is a mode for listening to music 310 of Bluetooth through a hearing aid earphone and music sound is amplified or reduced at a customized decibel to suit a hearing status of a user in a speaker mixer 220 through a decoder 320, and the music sound processed to be amplified and reduced is output through a speaker 230 of the hearing aid earphone. Here, as in the hearing mode, the mode processing unit 130 may amplify and reduce a decibel of music sound to match the customized decibel and may apply hearing correction data. Therefore, the mode providing system of the hearing aid earphone according to an example embodiment of the present invention may provide clearer sound quality by combining speech understanding through machine learning and an automated noise canceling function.

Describing the combination mode in which the hearing mode and the music mode are combined with reference to FIG. 4, in the hearing mode, the external sound input through the left hearing aid earphone 201 and the right hearing aid earphone 202 may be delivered to the speaker mixer 220 through the hearing mode 210, and in the music mode, the music sound by the music 310 of Bluetooth may be delivered to the speaker mixer 220 through the decoder 320. Therefore, the speaker mixer 220 amplifies or reduces the decibel of the music sound according to the customized decibel set according to a hearing status of each of the user's right ear and left ear and, at the same time, amplifies or reduces the decibel of the external sound and outputs the amplified or reduced music sound and external sound through the speaker 230.

Here, the mode processing unit 130 relates to changing the decibel of the external sound to be amplified or reduced by a smaller width than the decibel of the music sound, and minimizes collision between the music sound and the external sound by amplifying or reducing the decibel of the external sound and the decibel of the music sound at a preset ratio.

Figure 5:
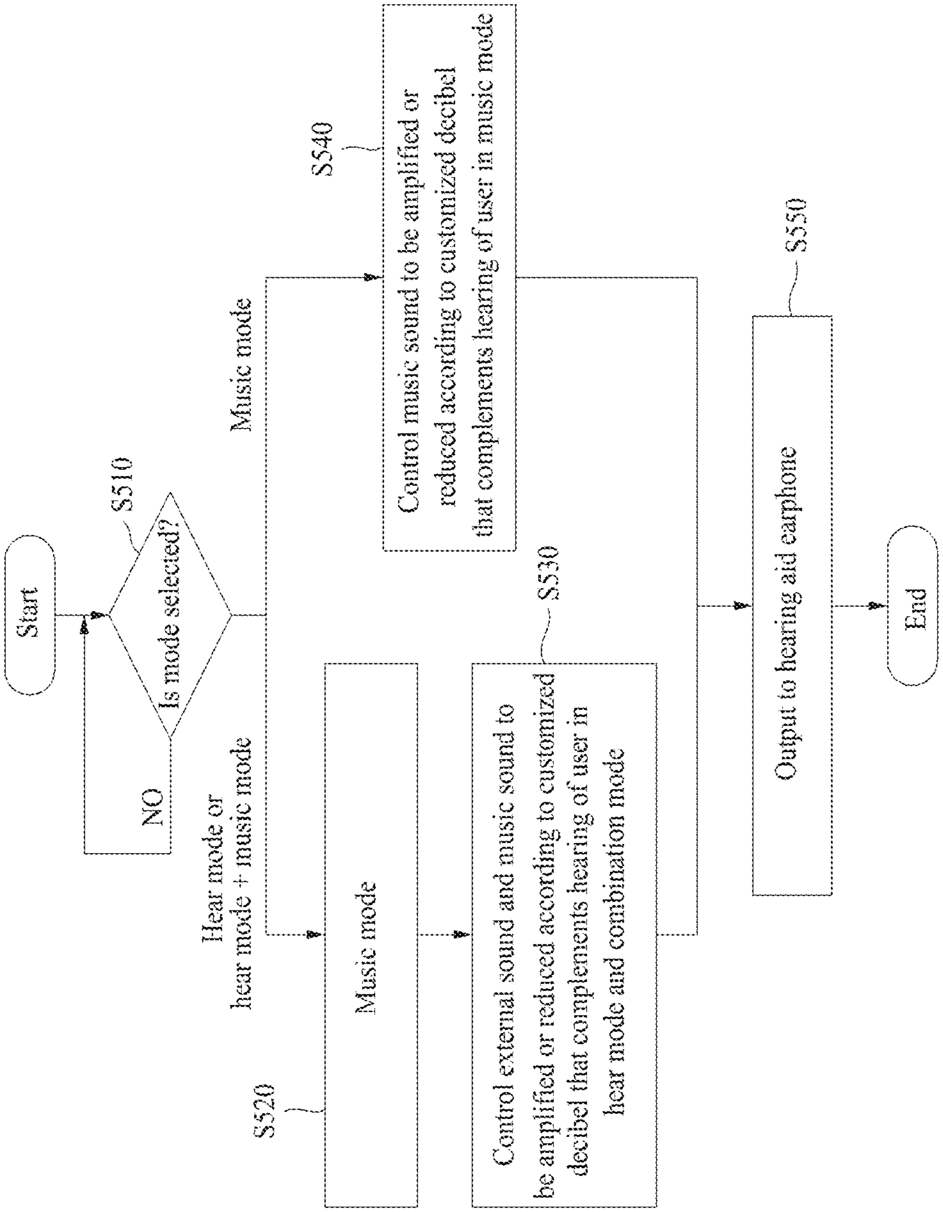
FIG. 5 is a flowchart illustrating a mode providing method of a hearing aid earphone according to an example embodiment of the present invention.

FIG. 5 is a flowchart illustrating a mode providing method of a hearing aid earphone according to an example embodiment of the present invention.

Referring to FIG. 5, operation S510 selects at least one mode from among a hearing mode of a hearing aid function and a music mode of an earphone function. Here, the hearing mode represents the hearing aid function and is a mode selected when having a conversation with another person. The music mode represents the earphone function and is a mode selected when listening to a song and may be a state in which a microphone (Mic) of the hearing aid earphone is locked. Operation S510 may select the hearing mode, the music mode, or a combination mode in which both are combined depending on a user's selection input, and may select one of the hearing mode, the music mode, and the combination mode depending on a time zone, whether surrounding voice is detected, or whether music is played.

When the hearing mode or the combination mode in which the hearing mode and the music mode are combined is selected through operation S510, operation S520 may input external sound that includes right sound input from a right hearing aid earphone worn on the user's right ear and left sound input from a left hearing aid earphone worn on the user's left ear.

Then, operation S530 may amplify or reduce the external sound according to a customized decibel that complements hearing of each of the user's right ear and left ear in the hearing mode and the combination mode.

For example, describing the hearing mode, similar to a general hearing aid, operation S530 may process a decibel of the external sound input through the left hearing aid earphone and the right hearing aid earphone to be amplified or reduced at the customized decibel to suit the user's hearing status. Here, operation S530 may adjust an EQ (equalizer) to the customized decibel suitable for the user to minimize noise from an external environment and to amplify voice and may provide clearer voice accordingly.

As another example, describing the combination mode in which the hearing mode and the music mode are combined, operation S530 may process the decibel of the external sound input through the left hearing aid earphone and the right hearing aid earphone to be amplified or reduced at the customized decibel to suit the hearing status of the user in the hearing mode and may process the decibel of the music sound to be amplified or reduced at the customized decibel set according to the hearing status of each of the user's right ear and left ear in the music mode. Here, operation S530 relates to changing the decibel of the external sound to be amplified or reduced by a smaller width than the decibel of the music sound, and minimizes collision between the music sound and the external sound by amplifying or reducing the decibel of the external sound and the decibel of the music sound at a preset ratio.

When the music mode is selected in operation S510, operation S540 may amplify or reduce the music sound according to the customized decibel that complements the hearing of each of the user's right ear and left ear. For example, operation S540 may process the decibel of the music sound to be amplified or reduced at the customized decibel suitable for the user's hearing status.

After processing of operations S530 and S540, operation S550 outputs the amplified or reduced external sound and music sound to the hearing aid earphone.

Figure 6:
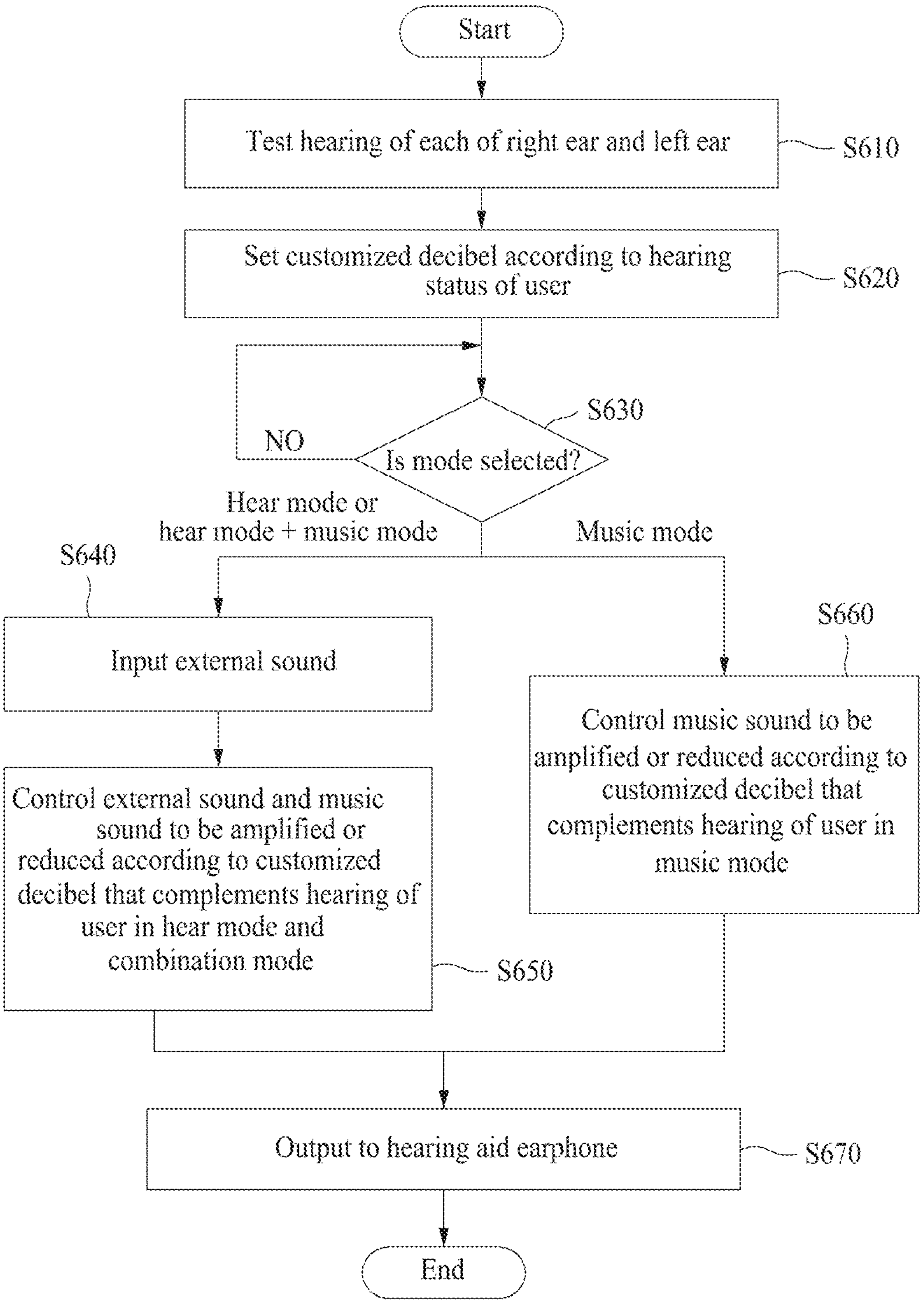
FIG. 6 is a flowchart illustrating a mode providing method of a hearing aid earphone according to another example embodiment of the present invention.

FIG. 6 is a flowchart illustrating a mode providing method of a hearing aid earphone according to another example embodiment of the present invention.

Referring to FIG. 6, operation S610 tests hearing of each of a user's right ear and left ear. Operation S610 may test the hearing of each of the user's both ears based on interaction between a left hearing aid earphone and a right hearing aid earphone worn on the user's left ear and right ear, respectively, and an application installed on the user's terminal.

Operation S620 sets a customized decibel that complements the hearing of each of the user's right ear and left ear according to a hearing status of the user based on test results. For example, even a person with difficulty of hearing may have a different hearing status for each of the left ear and the right ear. Therefore, through operation S620, the present invention may determine a hearing status of each of left and right ears suitable for the user, may correct a frequency suitable for each of the left ear and the right ear with an equalizer (EQ), and may set the customized decibel in music sound and external sound.

Operation S630 selects at least one mode from among a hearing mode of a hearing aid function and a music mode of an earphone function. Here, the hearing mode represents the hearing aid function and is a mode selected when having a conversation with another person. The music mode represents the earphone function and is a mode selected when listening to a song and may be a state in which a microphone (Mic) of the hearing aid earphone is locked. operation S630 may select the hearing mode, the music mode, or a combination mode in which both are combined depending on the user's selection input, and may select one of the hearing mode, the music mode, and the combination mode depending on a time zone, whether surrounding voice is detected, or whether music is played.

When the hearing mode or the combination mode in which the hearing mode and the music mode are combined is selected through operation S630, operation S640 may input the external sound that includes right sound input from a right hearing aid earphone worn on the user's right ear and left sound input from a left hearing aid earphone worn on the user's left ear.

Then, operation S650 may amplify or reduce the external sound according to a customized decibel that complements hearing of each of the user's right ear and left ear in the hearing mode and the combination mode.

For example, describing the hearing mode, similar to a general hearing aid, operation S650 may process a decibel of the external sound input through the left hearing aid earphone and the right hearing aid earphone to be amplified or reduced at the customized decibel to suit the user's hearing status. Here, operation S650 may adjust an EQ (equalizer) to the customized decibel suitable for the user to minimize noise from an external environment and to amplify voice and may provide clearer voice accordingly.

As another example, describing the combination mode in which the hearing mode and the music mode are combined, operation S650 may process the decibel of the external sound input through the left hearing aid earphone and the right hearing aid earphone to be amplified or reduced at the customized decibel to suit the hearing status of the user in the hearing mode and may process the decibel of the music sound to be amplified or reduced at the customized decibel set according to the hearing status of each of the user's right ear and left ear in the music mode. Here, operation S650 relates to changing the decibel of the external sound to be amplified or reduced by a smaller width than the decibel of the music sound, and minimizes collision between the music sound and the external sound by amplifying or reducing the decibel of the external sound and the decibel of the music sound at a preset ratio.

When the music mode is selected in operation S630, operation S660 may amplify or reduce the music sound according to the customized decibel that complements the hearing of each of the user's right ear and left ear. For example, operation S660 may process the decibel of the music sound to be amplified or reduced at the customized decibel suitable for the user's hearing status.

After processing of operations S650 and S660, operation S670 outputs the amplified or reduced external sound and music sound to the hearing aid earphone.

The systems or the apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, or a signal wave to be transmitted, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the example embodiments may be configured in a form of program instructions performed through various computer devices and recorded in computer-readable recording media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both a machine code, such as produced by a compiler, and files containing a higher-level code that may be executed by the computer using an interpreter. The hardware device may be configured to operate as at least one software module, or vice versa.

Mode

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved although the described techniques are performed in different order, and/or although components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A mode providing system of hearing aid earphones that provides a hearing mode and a music mode, the mode providing system comprising: a right earphone and a left earphone, a sound input unit configured to input external sound in the hearing aid earphones; a mode selection unit configured to select at least one mode from among a hearing mode of a hearing aid function and a music mode of an earphone function, wherein both the right earphone and left earphone operate in the same selected at least one hearing mode and music mode; a mode processing unit configured to amplify or reduce the external sound according to a customized decibel that complements hearing of each of a user's right ear and left ear in the hearing mode and to amplify or reduce music sound according to the customized decibel in the music mode; and a sound output unit configured to output the amplified or reduced external sound and music sound to the hearing aid earphones.

2. The mode providing system of claim 1, wherein the sound input unit is configured to input the external sound that includes right sound input from the right earphone worn on the user's right ear and left sound input from the left earphone worn on the user's left ear.

3. The mode providing system of claim 1, wherein the mode processing unit is configured to amplify or reduce sound according to the customized decibel that complements the hearing of each of the user's right ear and left ear depending on the hearing mode or the music mode, and a combination mode in which the hearing mode and the music mode are combined.

4. The mode providing system of claim 1, wherein the mode processing unit is configured to amplify or reduce a decibel of the external sound input through the sound input unit according to the customized decibel set according to a hearing status of each of the user's right ear and left ear, in the hearing mode.

5. The mode providing system of claim 1, wherein the mode processing unit is configured to amplify or reduce a decibel of the music sound output through the hearing aid earphones according to the customized decibel set according to a hearing status of each of the user's right ear and left ear, in the music mode.

6. The mode providing system of claim 1, wherein the mode processing unit is configured to amplify or reduce a decibel of the music sound according to the customized decibel set according to a hearing status of each of the user's right ear and left ear through the music mode and, at the same time, to operate the hearing mode and change a decibel of the external sound input through the sound input unit, in a combination mode in which the hearing mode and the music mode are combined.

7. The mode providing system of claim 6, wherein the mode processing unit is configured to change the decibel of the external sound collected in the combination mode to be amplified or reduced by a smaller width than the decibel of the music sound.

8. The mode providing system of claim 7, wherein the mode processing unit is configured to minimize collision between the music sound and the external sound by amplifying or reducing the decibel of the external sound and the decibel of the music sound at a preset ratio, in the combination mode.

9. A mode providing system of a-hearing aid earphones that provides a hearing mode and a music mode, the mode providing system comprising: a right earphone and a left earphone, a hearing test unit configured to test hearing of each of a user's right ear and left ear; a setting unit configured to set a customized decibel that complements the hearing of each of the user's right ear and left ear according to a hearing status of the user based on test results; a sound input unit configured to input external sound; a mode selection unit configured to select at least one mode from among a hearing mode of a hearing aid function and a music mode of an earphone function, wherein both the right earphone and left earphone operate in the same selected at least one hearing mode and music mode; a mode processing unit configured to amplify or reduce the external sound according to the customized decibel in the hearing mode and to amplify or reduce music sound according to the customized decibel in the music mode; and a sound output unit configured to output the amplified or reduced external sound and music sound to the hearing aid earphones.

10. A mode providing method of hearing aid earphones that provides a hearing mode and a music mode, the mode providing method comprising: selecting at least one mode from among a hearing mode of a hearing aid function and a music mode of an earphone function, wherein both a right earphone and a left earphone of the hearing aid earphones operate in the same selected at least one hearing mode and music mode; controlling external sound to be amplified or reduced according to a customized decibel that complements hearing of each of a user's right ear and left ear in the hearing mode and music sound to be amplified or reduced according to the customized decibel in the music mode; and outputting the amplified or reduced external sound and music sound to the hearing aid earphones.

11. The mode providing method of claim 10, further comprising: inputting the external sound that includes right sound input from the right earphone worn on the user's right ear and left sound input from the left earphone worn on the user's left ear.

12. The mode providing method of claim 10, wherein the controlling comprises amplifying or reducing sound according to the customized decibel that complements the hearing of each of the user's right ear and left ear depending on the hearing mode or the music mode, and a combination mode in which the hearing mode and the music mode are combined.

13. The mode providing method of claim 10, wherein the controlling comprises amplifying or reducing a decibel of the external sound input through the sound input unit according to the customized decibel set according to a hearing status of each of the user's right ear and left ear, in the hearing mode.

14. The mode providing method of claim 10, wherein the controlling comprises amplifying or reducing a decibel of the music sound output through the hearing aid earphones according to the customized decibel set according to a hearing status of each of the user's right ear and left ear, in the music mode.

15. The mode providing method of claim 10, wherein the controlling comprises amplifying or reducing a decibel of the music sound according to the customized decibel set according to a hearing status of each of the user's right ear and left ear through the music mode and, at the same time, to operate the hearing mode and change a decibel of the external sound input through the sound input unit, in a combination mode in which the hearing mode and the music mode are combined.

16. The mode providing method of claim 15, wherein the controlling comprises changing the decibel of the external sound collected in the combination mode to be amplified or reduced by a smaller width than the decibel of the music sound.

17. The mode providing method of claim 16, wherein the controlling comprises minimizing collision between the music sound and the external sound by amplifying or reducing the decibel of the external sound and the decibel of the music sound at a preset ratio, in the combination mode.

* * * * *